United States Patent [19]

Harrell

[11] 4,397,334

[45] Aug. 9, 1983

[54] FLUID CONTROL SYSTEM

[75] Inventor: David M. Harrell, Severna Park, Md.

[73] Assignee: Westinghouse Electric Corp., Pittsburgh, Pa.

[21] Appl. No.: 270,473

[22] Filed: Jun. 4, 1981

[51] Int. Cl.³ .............................................. F15B 13/02
[52] U.S. Cl. .............................. 137/624.11; 137/552.5; 91/527
[58] Field of Search ................. 137/552.5; 91/527, 36; 137/624.11

[56] References Cited

U.S. PATENT DOCUMENTS 3,589,242 6/1971 Peterson ........................... 91/527 X
3,708,047 1/1973 Kuhnle .......................... 137/552.5 X Primary Examiner—Alan Cohan Attorney, Agent, or Firm—D. Schron

[57] ABSTRACT

Control valves govern the operation of a plurality of hydraulically-activated devices movable between extended and retracted positions. The control valves are interconnected to a plurality of control lines which carry hydraulic fluid and activation of a particular control valve will establish a certain hydraulic signal pressure pattern within the control lines indicative of a certain commanded position of one of the devices. A decoding section responsive to the signal pressure pattern allows for high pressure hydraulic flow to the selected device and in addition sets up a low pressure return path therefor. A significantly greater number of devices can be controlled with a relatively few control lines thereby reducing construction, maintenance and material costs.

13 Claims, 14 Drawing Figures

FLUID CONTROL SYSTEM

BACKGROUND OF THE INVENTION

1. Field of the Invention

The invention generally relates to control of fluidic systems and in particular to a hydraulic system having hydraulically activated devices wherein the activation is selected from a location remote from the devices.

2. Description of the Prior Art

A variety of fluidic systems exist which require the selective activation of a plurality of fluid activated devices such as hydraulic actuators and/or hydraulic motors. In many of these systems, activation is to be effected from a remote location and each fluid activated device is connected directly to its own respective control valve through hydraulic lines.

In many systems, the control valves are in an enclosed area relative to the fluid activated devices thereby necessitating penetration of the enclosed area to effect fluid connection. For a complex system having many fluid activated devices, an excessive number of penetrations is required. The installation, quality assurance checks, and maintenance of hydraulic lines and penetrations represents a relatively expensive and time consuming task.

The present invention provides for a control system for governing the operation of fluid activated devices, however, with a significant reduction in installation and maintenance costs.

SUMMARY OF THE INVENTION

The control system of the present invention is operable to selectively control a plurality of fluid activated devices and includes a plurality of fluid control lines as well as a plurality of control valves for impressing predetermined signal pressure patterns of relatively high and low pressures in the control lines in accordance with which control valve is activated. The total number of control valves is greater than the total number of control lines and in a preferred embodiment, if there are N control valves for controlling a number of devices, there will be n control lines, where $2^n \geq 2N$.

The control lines are connected to a decoding means which is responsive to the signal pressure patterns so as to connect a source of activating fluid to selected ones of the fluid activated devices, in accordance with the pressure pattern.

DESCRIPTION OF THE PREFERRED EMBODIMENT

Figure 1:
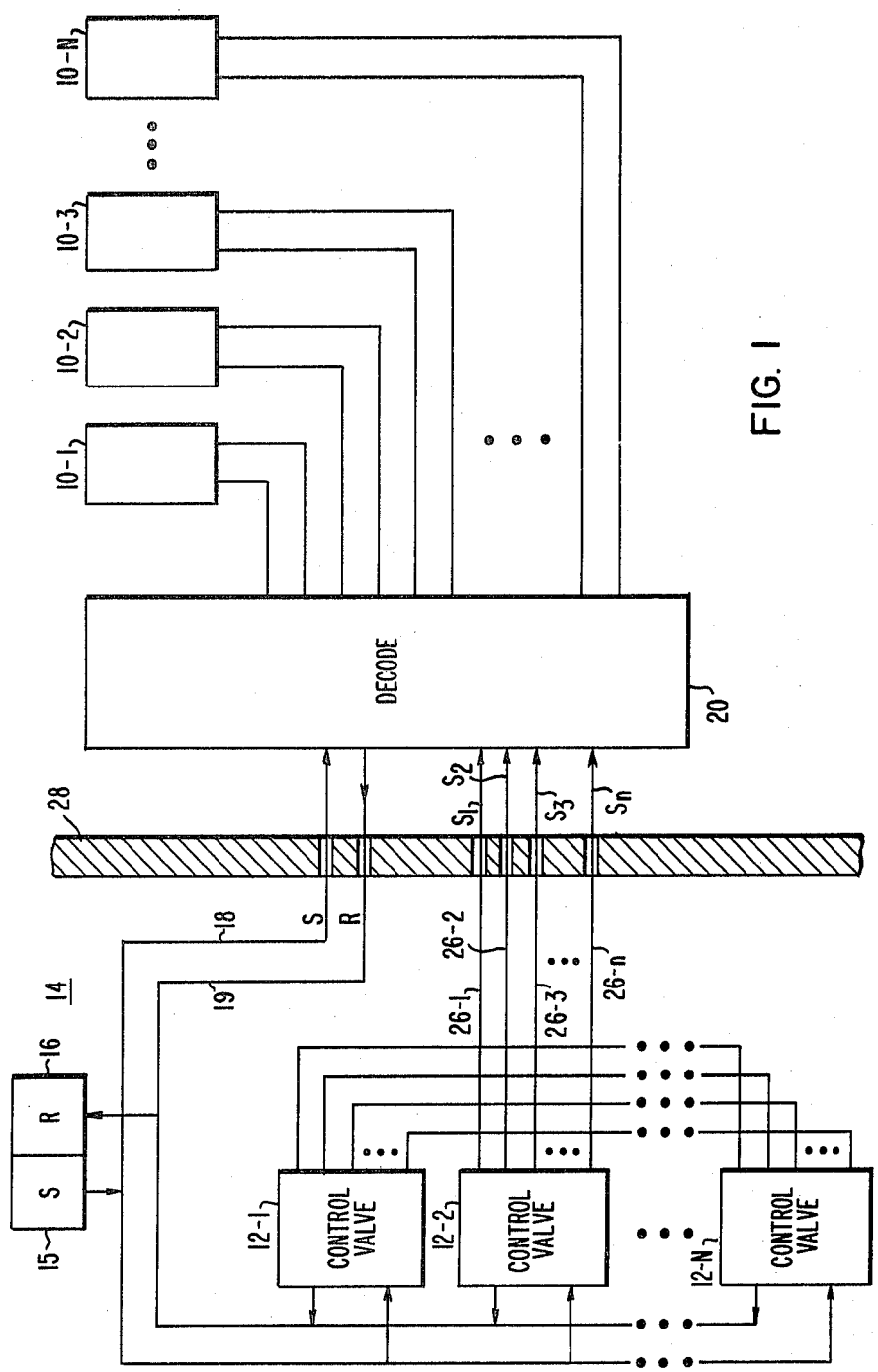
FIG. 1 is a block diagram of a fluid control system in accordance with the present invention.

In FIG. 1, fluid activated devices 10-1 to 10-N are controlled by a plurality of control valves 12-1 to 12-N, and in one embodiment, there is a one-to-one correspondence such that control valves 12-1 to 12-N, respectively control fluid activated devices 10-1 to 10-N. The arrangement includes a source of activating fluid 14 which, in the embodiment illustrated, includes a high pressure supply side 15 and a low pressure return side 16. Movement of the fluid activated devices by the activating fluid from source 14 through supply line 18 and return line 19 is effected by means of the decode network 20 connecting the chosen fluid activated device with lines 18 and 19 in accordance with the activation of a selected control valve. As will be explained, activation of a particular control valve will set up a predetermined signal pressure pattern $S_1$ to $S_n$ of relatively high and low pressures in a plurality of signal control lines 26-1 to 26-n.

In one embodiment, and as illustrated in FIG. 1, the high pressure supply 15 and low pressure return 16 may additionally be connected to the respective control valves 12-1 to 12-N for establishing the pressure pattern in the lines 26-1 to 26-n in accordance with which of the control valves is activated.

For some systems, the control valves may be remote from the fluid activated devices and may be situated in a separate enclosure. This arrangement necessitates a plurality of penetrations in the enclosure wall 28. With the present arrangement the number of such penetrations is substantially reduced thus reducing installation and maintenance costs. Further, a typical system may have thousands of feet of fluid lines and the present arrangement not only decreases the number and total length of such lines, but allows the signal lines 26-1 through 26-n to be of relatively smaller diameter than the supply and return lines 18 and 19, thus effecting an even greater savings.

By way of example, if there are N fluid activated devices, each normally requiring a supply and return line, then there will be 2N penetrations required. With the present arrangement, with n control lines each accommodating either a high pressure or low pressure signal, it may be shown that $2^n \geq 2N$; for example, if there are four signal lines, then eight fluid activated devices can be accommodated. A system which has 128 fluid activated devices to be operated would normally require 256 penetrations whereas with the present arrangement with the inclusion of the supply and return lines, only a total of 10 penetrations would be needed, representing a 96% reduction in the amount of penetrations as well as a vast reduction in the number of fluid lines required.

Figure 2:
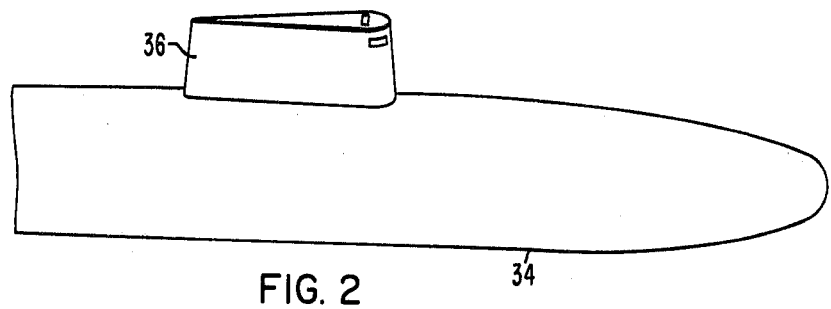
FIG. 2 illustrates a portion of a submarine, representing a system in which the present invention is applicable.

The control arrangement is applicable to industrial and a variety of other systems and will be described by way of example with respect to a submarine. FIG. 2 illustrates a typical submarine 34 which includes as part of its structure a sail 36. Sail 36 contains various components which must be raised and lowered during operation of the submarine and which components and their drive mechanisms are located outside of the submarine pressure hull whereas the controls for such components are located within the pressure hull.

Figure 3:
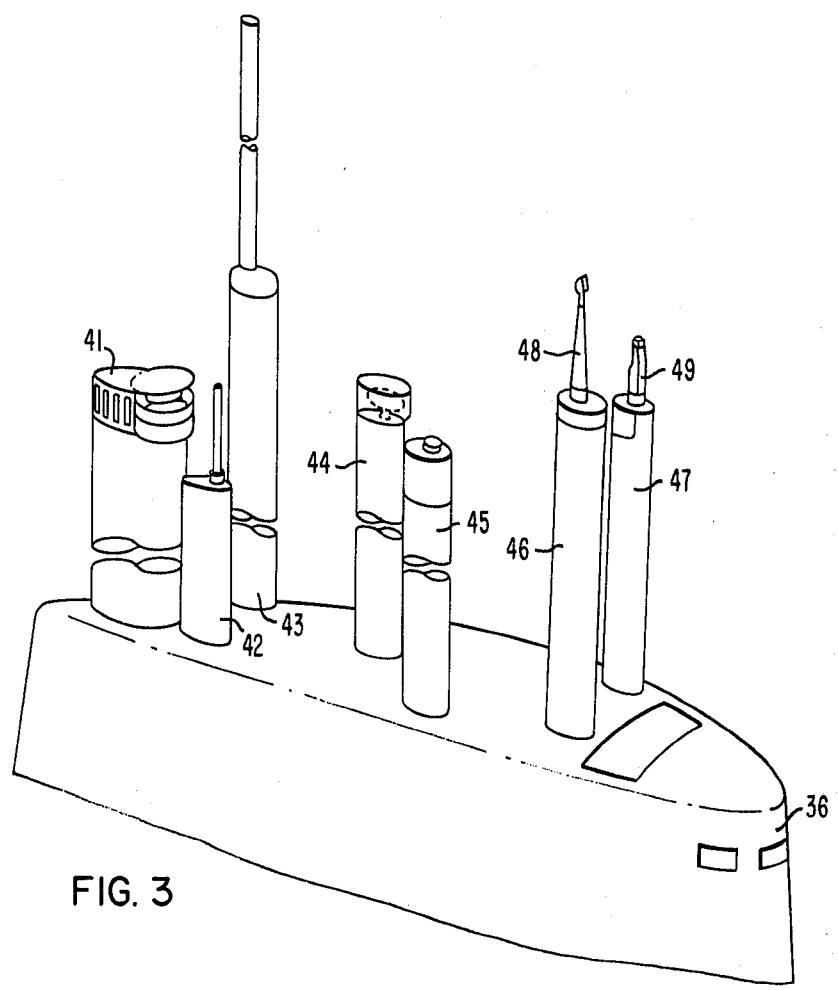
FIG. 3 illustrates the sail of the submarine in somewhat more detail including various fluid activated devices contained therein.

By way of example, FIG. 3 illustrates the sail 36 in somewhat more detail and includes, for purposes of illustration, seven components which are activated to an extended position and thereafter retracted. Illustrated components are the submarine snorkel mast 41, antenna masts 42 to 45 and periscope fairings 46 and 47 for respective periscopes 48 and 49.

Figure 4:
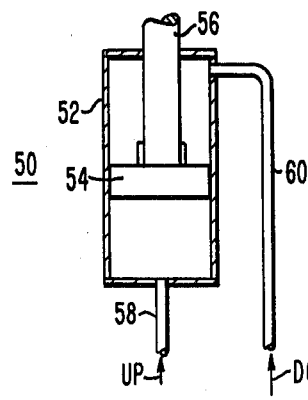
FIG. 4 is a schematic simplified diagram of one type of fluid activated device.

FIG. 4 serves to basically illustrate the operation of a typical fluid activated device for driving a component between two operating positions. The fluid activated device 50 includes a cylinder member 52 having a piston 54 movable therein and to which is attached a component 56 representative of any one of the components 41 to 47. If fluid such as a hydraulic fluid is provided to the lower side of piston 54 through hydraulic line 58, the component 56 will move to its first or extended position with hydraulic line 60 serving as a return line for the hydraulic fluid above the piston 54. When the component 56 is to be driven to a second or retracted position, hydraulic fluid may be provided to line 60 to thereby drive piston 54 back down, with line 58 serving as a return line.

Figure 5:
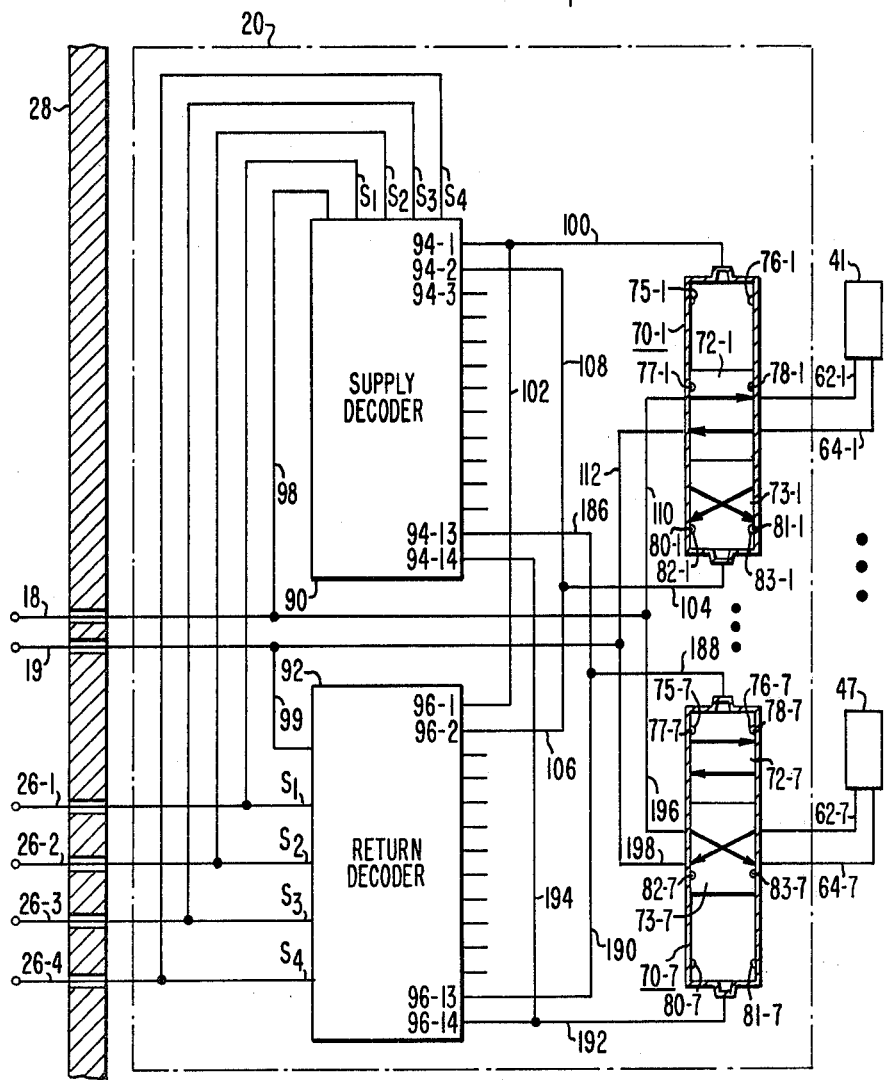
FIG. 5 is a block diagram illustrating the decode portion of FIG. 1 in more detail.

FIG. 5 illustrates the decoder portion of FIG. 1 in somewhat more detail as it would apply to the exemplary embodiment of controlling seven devices, as in FIG. 3.

Decoder 20 includes a plurality of output spool valves 70 for controlling the flow of hydraulic fluid to and from a respective mast or fairing. Spool valve 70-1 thus controls operation of snorkel mast 41 by controlling the hydraulic fluid in line 62-1 and 64-1 and output spool valve 70-7 controls operation of the periscope fairing 47 by governing fluid flow in hydraulic lines 62-7 and 64-7. Other output valves (not illustrated) are provided for respectively controlling the operation of the remaining components. A typical output spool valve 70-1 includes a movable spool having adjacent spool sections 72-1 and 73-1 with the fluid path therethrough being illustrated by the arrows therein.

The output valves are of the bistable type in that the spools are movable between first and second positions and when so moved will remain in a particular position until actively moved to its other position. This operation may be accomplished with the provision of spring loaded pins 75-1 and 76-1 which cooperatively engage detents 77-1 and 78-1 on spool member 72-1 when the spool is in the upper position and with spring loaded pins 80-1 and 81-1 cooperatively engaging detents 82-1 and 83-1 on spool section 73-1 when the spool is in the lower position illustrated. A similar arrangement is provided for the remaining output valves.

In the present example, seven devices are being controlled and accordingly four control lines 26-1 to 26-4 are required. A supply decoder 90 and a return decoder 92 are provided for interpreting the pattern of pressure signals carried by the control lines 26-1 through 26-4 so as to move the spools of the output valves 70-1 through 70-7 as dictated by the pattern for selective operation of a mast or fairing.

The supply decoder 90 includes a plurality of output ports which, for the present example, will be 14 in number and designated 94-1 through 94-14. Similarly, return decoder 92 includes 14 input ports designated 96-1 through 96-14. Both the supply decoder 90 and return decoder 92 are operably connected to the control lines 26-1 through 26-4 and in addition, supply decoder 90 is connected to the high pressure supply line 18, via line 98, whereas the return decoder 92 is connected to the low pressure return line 19, via line 99. It is seen that for the control of seven devices, only six penetrations are required in the enclosure wall 28, representing the submarine pressure hull, instead of the conventional 14 penetrations previously required.

By way of example, an operation will be considered whereby the snorkel mast 41 is to be raised. As will be explained, a selected control valve causes a pressure signal pattern in the control lines 26-1 to 26-4 to set the supply decoder to open port 94-1 thus allowing high pressure fluid to flow from line 18, into the top of output valve 70-1 via the path including line 18, line 98, supply decoder 90, port 94-1 and line 100 thus forcing the spool of valve 70-1 to the position illustrated in FIG. 5. Line 102 connects line 100 with port 96-1 of return decoder 92 and accordingly to avoid a short circuiting of the hydraulic fluid, the return decoder 92 ensures that port 96-1 is closed.

The hydraulic fluid which is forced out of the bottom of output valve 70-1 by virtue of movement of its spool is afforded a return path by lines 104, 106, port 96-2 of decoder 92, line 99 to low pressure return line 19. Since line 108 is also connected to line 104, the supply decoder 90 ensures that output port 94-2 is closed to avoid a short circuit situation.

Thus, with the spool of output valve 70-1 in the position illustrated, high pressure fluid in supply line 18 may be provided to snorkel mast 41 to effect its deployment by means of the path including supply line 18, line 110, through spool section 72-1 and out line 62-1. The return hydraulic fluid from the snorkel mast 41 is returned to the low pressure line 19 by the path including line 64-1, through spool section 72-1, line 112 to line 19.

If it is desired to retract the snorkel mast, a pressure pattern will be established by activation of the proper control valve so as to cause supply decoder 90 to close port 94-1 and open port 94-2 and to cause return decoder 92 to open port 96-1 and close port 96-2. In this manner, high pressure fluid will exit from port 94-2 and enter the bottom of output valve 70-1 by the path including lines 108 and 104 to move its spool to its second position whereby fluid previously in the upper portion of valve 70-1 is afforded a drain path via line 100, 102 and port 96-1 of decoder 92. High pressure fluid on line 18 will then be provided via line 110 and spool section 73-1 to line 64-1 to effect the retraction while return hydraulic fluid is returned to the low pressure line 19 by the path including line 62-1 through spool section 73-1, line 112 to line 19.

Figure 6:
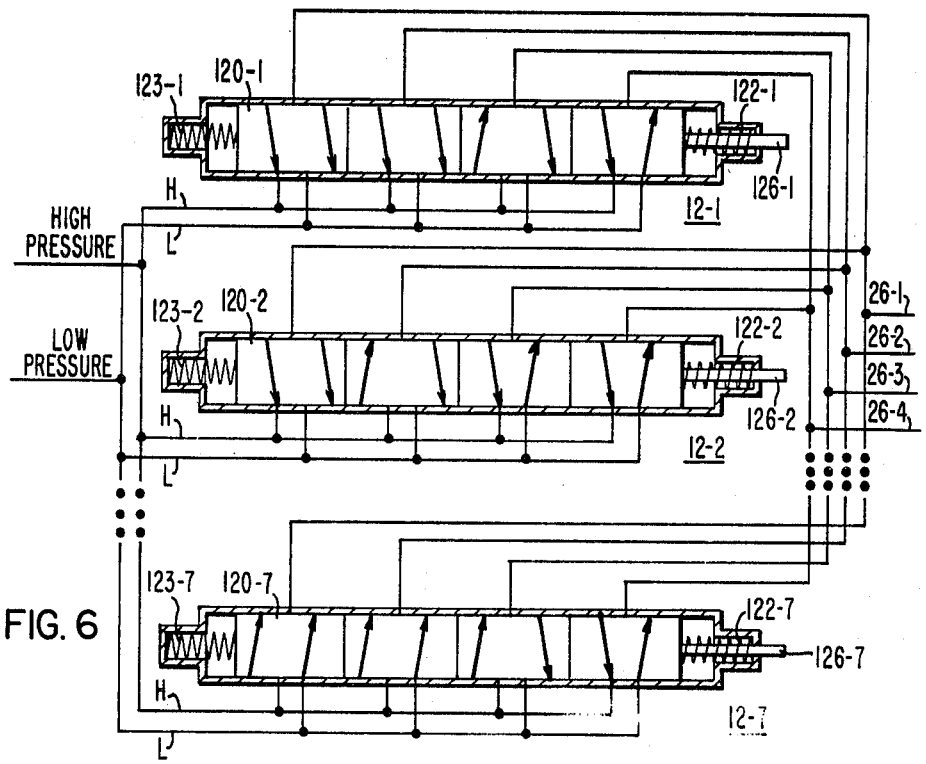
FIG. 6 illustrates the control valves of FIG. 1 in more detail.

One arrangement by which the coded signal pressure pattern may be impressed on the control lines is by the arrangement illustrated in FIG. 6 showing the control valves 12 in somewhat more detail. A typical control valve such as control valve 12-1 includes a movable spool 120-1 centered by means of springs 122-1 and 123-1. Each spool has four spool sections with the flow through each section being indicated by the arrows therein. All of the spools 120-1 through 120-7 of FIG. 6 are illustrated in a neutral position wherein no particular pressure pattern is induced on the signal lines whereas movement of the spool to the right or left of its neutral position will cause a certain pressure pattern to be set up in control lines 26-1 through 26-4. This movement may be accomplished by well-known means (not shown) such as electrical activation, hydraulic activation, mechanical activation, manual activation, or combinations thereof. A valve stem 126-1 is attached to the spool at one end thereof for a purpose to be described.

Figure 7:
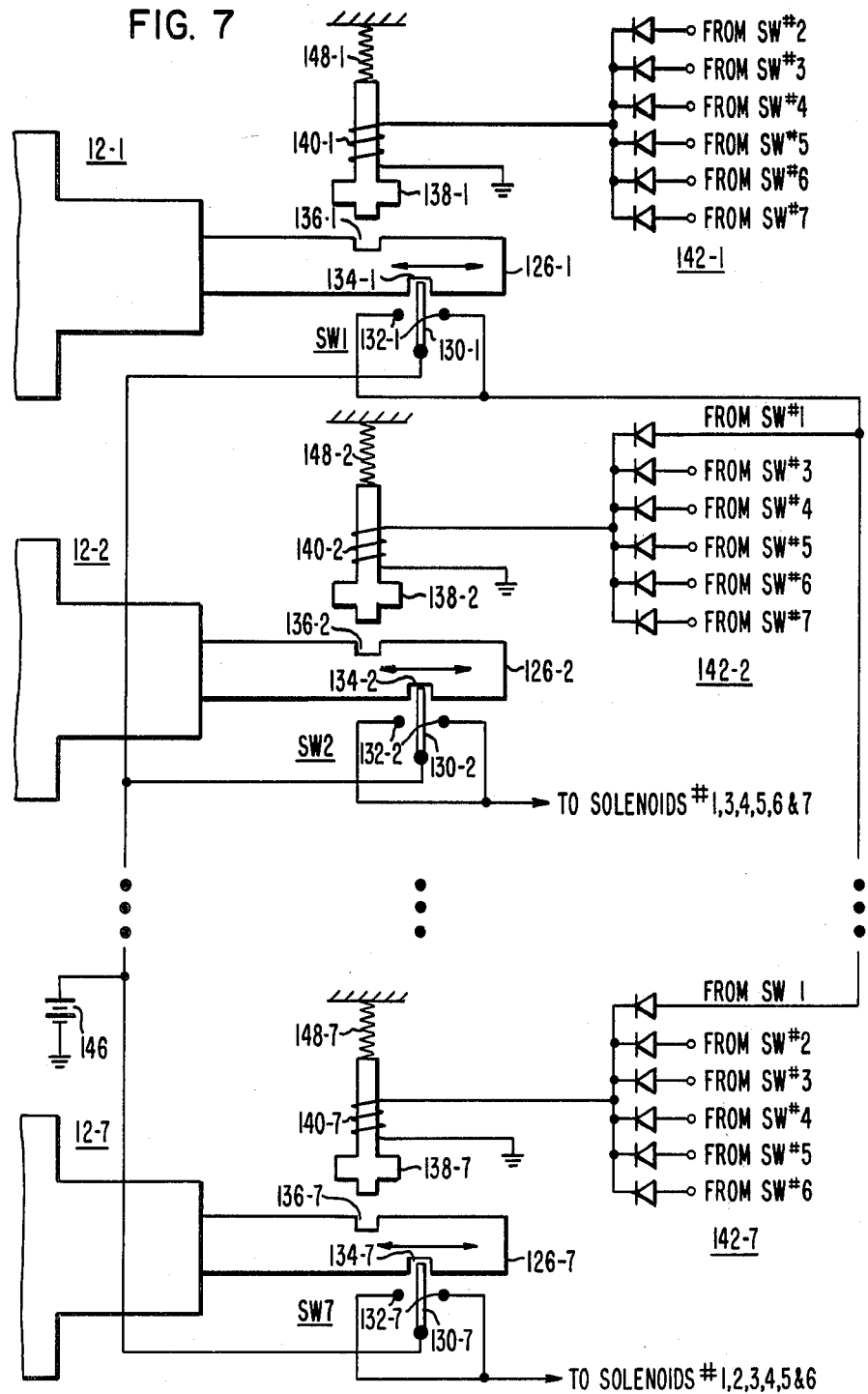
FIG. 7 is a diagram representing a control valve interlocked system.

In order to avoid simultaneous activation of two or more control valves which may result in an undesired or undefined pressure pattern, an interlocking mechanism arrangement such as illustrated in FIG. 7 may be provided. Each of the valve stems 126-1 to 126-7 has associated therewith a respective switch SW1 to SW7 each having a movable toggle member 130-1 to 130-7 movable between contact members 132-1 to 132-7, respectively.

Means are provided for moving the toggle members in response to activation of the control valves. For example, each of the toggle members fits into a respective indent portion 134-1 to 134-7 of the valve stems which additionally include a second indented portion 136-1 to 136-7 for receipt of respective solenoid driven locking pins 138-1 to 138-7.

The solenoids 140-1 to 140-7 for activating the pins are connected to respective diode arrays 142-1 to 142-7 in a manner that when any valve is actuated, it will cause the locking pins of all the other valves to engage the valve stem to prevent movement and therefore activation thereof.

This operation is accomplished with the provision of a source of electrical power such as battery 146 connected to the toggles of all the switches such that when a valve is actuated causing movement of its valve stem in either direction (as indicated by the arrow on the valve stem), an electrical circuit will be completed from battery 146 through the toggle, through one of the switch contacts and to all of the diode arrays of the non-activated valve. This connection energizes the solenoids associated with those valves to thereby drive the locking pins into place. After the activation and when the valve returns to its neutral position, the solenoids are deenergized and the locking pins return to the position illustrated under control of respective springs 148-1 to 148-7 and the arrangement is then prepared for a subsequent activation.

Movement of the control valve spools to the right or left of their neutral positions will set up different signal pressure patterns in the control lines 26-1 to 26-4 to govern the raising and lowering of devices 41 to 47. If a high pressure signal is designated by H and a low pressure signal by L, then one pattern combination which may be utilized is as set forth in the following Table:

| $S_1$ | $S_2$ | $S_3$ | $S_4$ | |
|---|---|---|---|---|
| L | L | L | H | snorkel mast 41 - up |
| L | L | H | L | snorkel mast 41 - down |
| L | L | H | H | mast 42 - up |
| L | H | L | L | mast 42 - down |
| L | H | L | H | mast 43 - up |
| L | H | H | L | mast 43 - down |
| L | H | H | H | mast 44 - up |
| H | L | L | L | mast 44 - down |
| H | L | L | H | mast 45 - up |

-continued

| $S_1$ | $S_2$ | $S_3$ | $S_4$ | |
|---|---|---|---|---|
| H | L | H | L | mast 45 - down |
| H | L | H | H | fairing 46 - up |
| H | H | L | L | fairing 46 - down |
| H | H | L | H | fairing 47 - up |
| H | H | H | L | fairing 47 - down |

Figure 8:
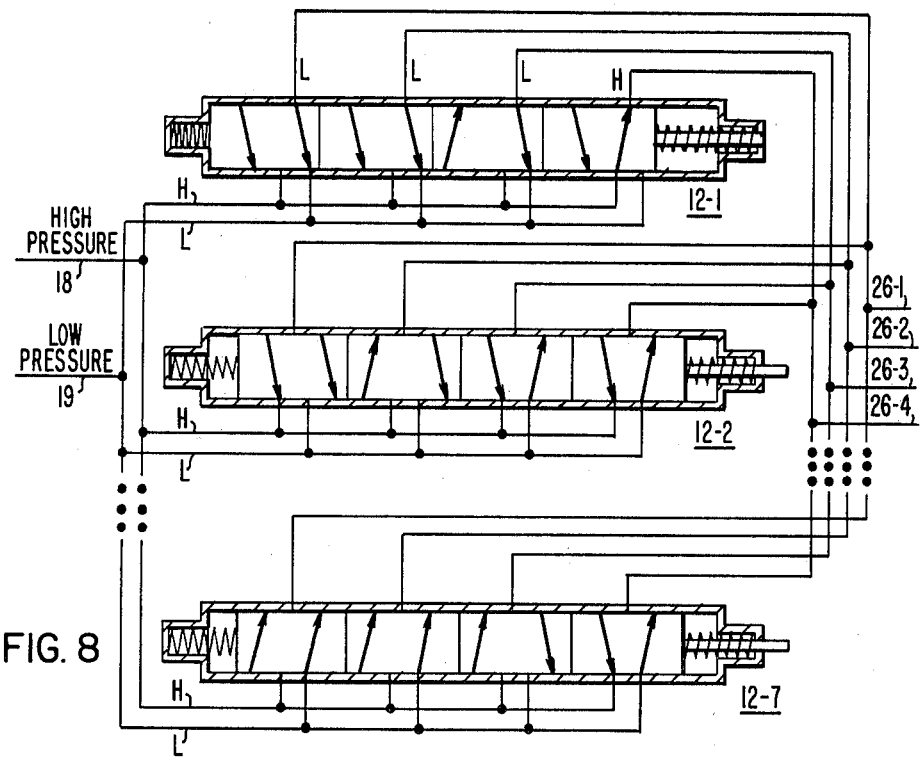
FIG. 8 is a view as in FIG. 6, however, illustrating the valve arrangement for activation of a first device.

With respect to the raising of the snorkel mast 41, the above Table indicates that a pressure pattern of LLLH will accomplish the desired operation. When the spool of the control valve 12-1 is moved to its leftmost position as illustrated in FIG. 8, the signal lines are connected to the respective high and low pressure lines so as to establish the desired pattern. The valves are arranged, as illustrated in FIGS. 6 and 8 so that movement of the spool to the left will cause a corresponding device to raise while movement of the spool to the right will cause it to retract, the pressure patterns thus established being in accordance with the above Table.

Figure 9:
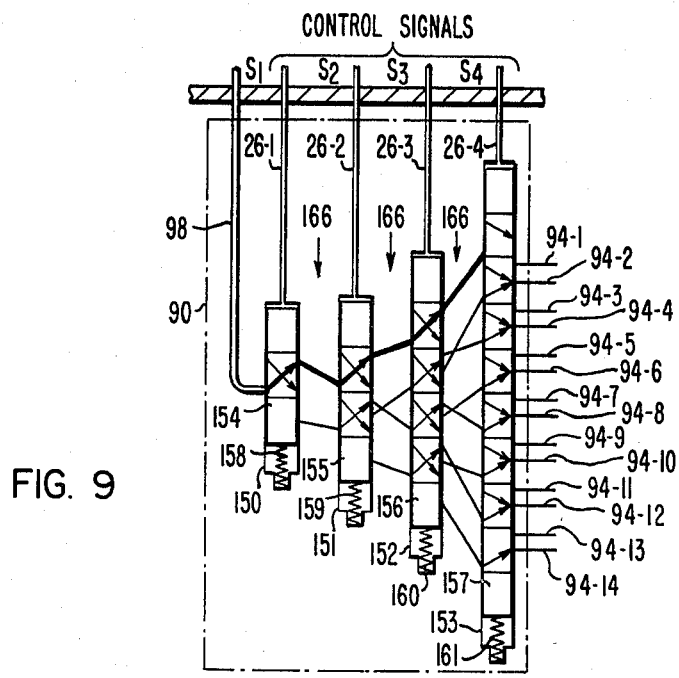
FIG. 9 illustrates the supply decoder of FIG. 5 in more detail.

As was stated with respect to FIG. 5, the pressure pattern sets up the supply and return decoders 90 and 92 so as to effect the desired activation. One example of a supply decoder is illustrated in more detail in FIG. 9. The decoder 90 includes four valves 150 to 153 connected to respective signal lines 26-1 to 26-4 with each valve including a respective spool 154 to 157 normally biased to the position illustrated by means of respective springs 158 to 161. Fluid paths 166 are established between the valves and fluid flow through the spools are as indicated by the arrows therein. High pressure fluid flow through the arrangement is as indicated by the heavy line and it is seen that for the neutral position illustrated, there is no exit of the high pressure fluid from the decoder 90.

Figure 10:
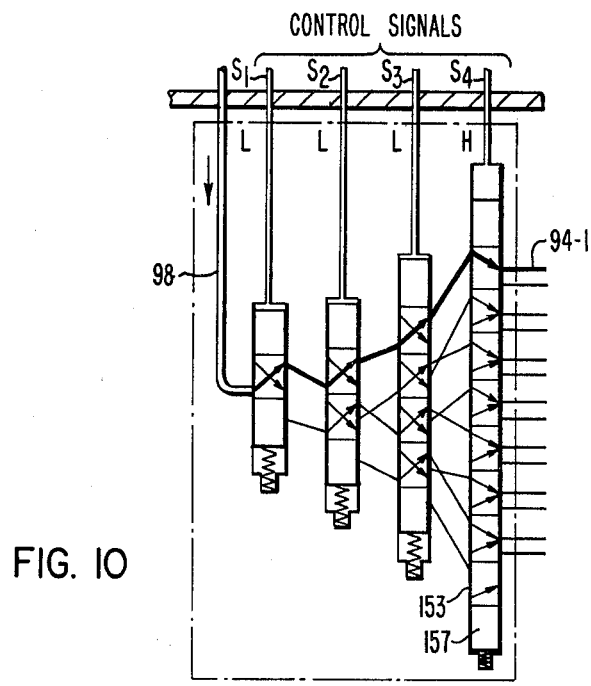
FIG. 10 is a view as in FIG. 9 illustrating the valve position for operation of the first device.

When control valve 12-1 is activated as in FIG. 8, the LLLH pressure pattern established forces spool 157 of valve 153 to the position as illustrated in FIG. 10, and a completed fluid path is established from the high pressure line 98 to output port 94-1, as illustrated by the heavy line. The flow of high pressure oil out of port 94-1 thus activates the output valve 70-1 of FIG. 5 to the position illustrated so as to raise the snorkel mast.

Figure 11:
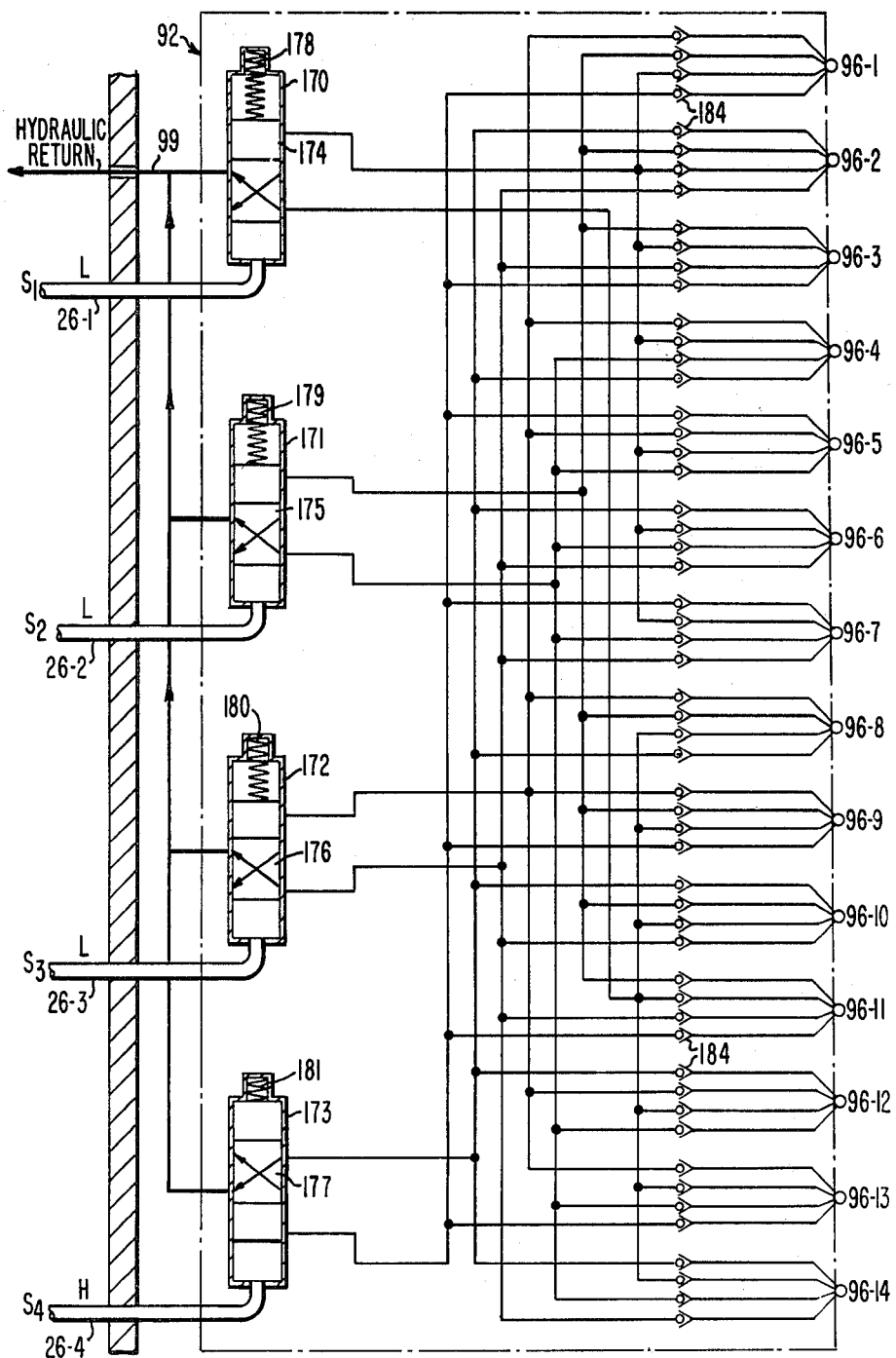
FIG. 11 illustrates the return decoder of FIG. 5 in more detail.

FIG. 11 illustrates the return line decoder 92 positioned in response to the LLLH signal pressure pattern for this snorkel mast operation. Decoder 92 includes a plurality of valves 170 to 173 each including a respective spool member 174 to 177 biased by means of respective springs 178 to 181. The LLLH pressure pattern forces spool 177 of valve 173 to its upper position while the spools of the remaining valves are in their lower position.

Each of the ports 96-1 to 96-14 branches out into four lines with each line being connected to a respective one of the valves 170 to 173 so that fluid appearing at any one of the ports will be provided to all of the valves and a passage therethrough to the return line 99 will depend upon the spool position within the valve. In order to prevent fluid short circuiting, a check valve 184 is provided for each line.

Returning to the snorkel mast example and with additional reference to FIG. 5, it has been mentioned that for this operation, port 96-1 must be closed. Following the lines from port 96-1, it is seen that the top line is connected to valve 172, the next line to valve 171, the next line to valve 170 and the bottom line to valve 173. The spool positions for these valves do not afford a return path for any fluid at port 96-1. With respect to the fluid drainage out of output valve 70-1 through lines 104 and 106 to port 96-2, it is seen that the topmost branch line from port 96-2 is connected to valve 173 and is afforded a return path therethrough as is the last line connected to valve 172.

Figure 12:
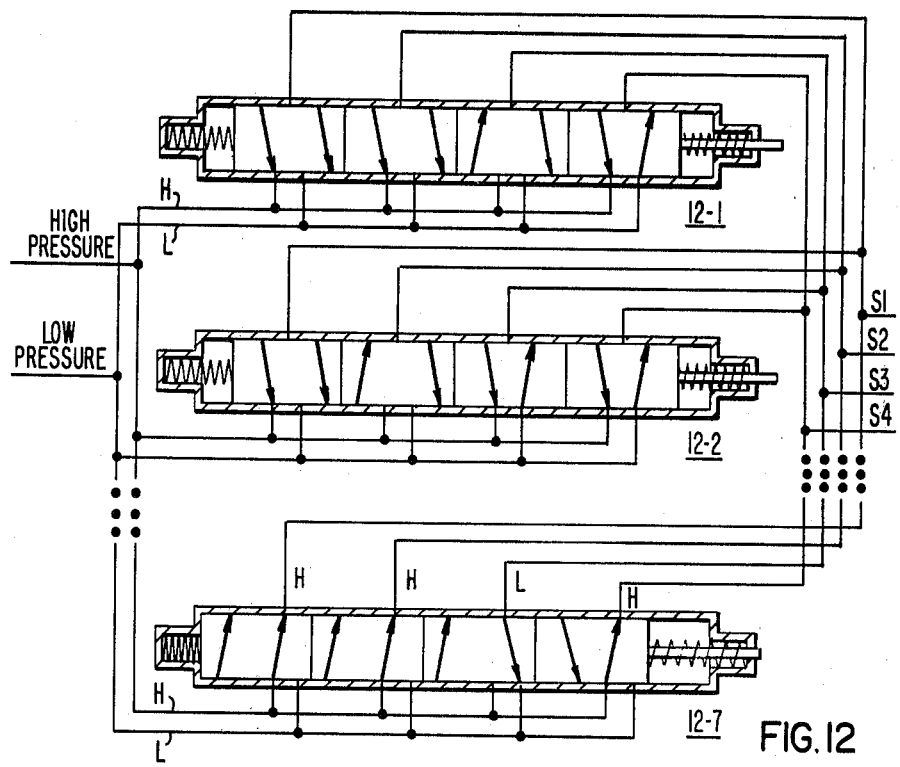
FIG. 12 is a view as in FIG. 6 illustrating the valve position for operation of another device.
Figure 13:
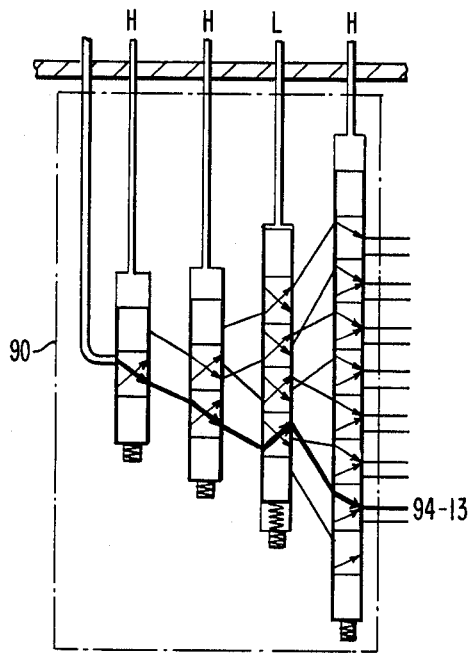
FIGS. 13 and 14 are the supply and return decoders illustrated in a position for operation of the other device.

By way of further example, let it be assumed that the periscope fairing 47 is to be activated to its extended position. In such instance, control valve 12-7 is activated to its leftmost position as illustrated in FIG. 12 so as to place an HHLH signal pattern on the control lines. In response to this pattern, and as illustrated in FIG. 13, the valve spools of the supply decoder 90 are arranged to afford a fluid path from supply line 98 to port 94-13 as illustrated by the heavy line.

As seen in FIG. 5, high pressure fluid emanating from port 94-13 drives the spool of output valves 70-7 to its other bistable condition by the path including lines 186 and 188. Port 96-13 of return decoder 92 is closed so as to prevent a short circuit flow through line 190. Fluid is drained from the bottom of valve 70-7 and is returned through port 96-14 via line 192, while port 94-14 of the supply decoder is closed so as to prevent a short circuit flow via line 194.

Figure 14:
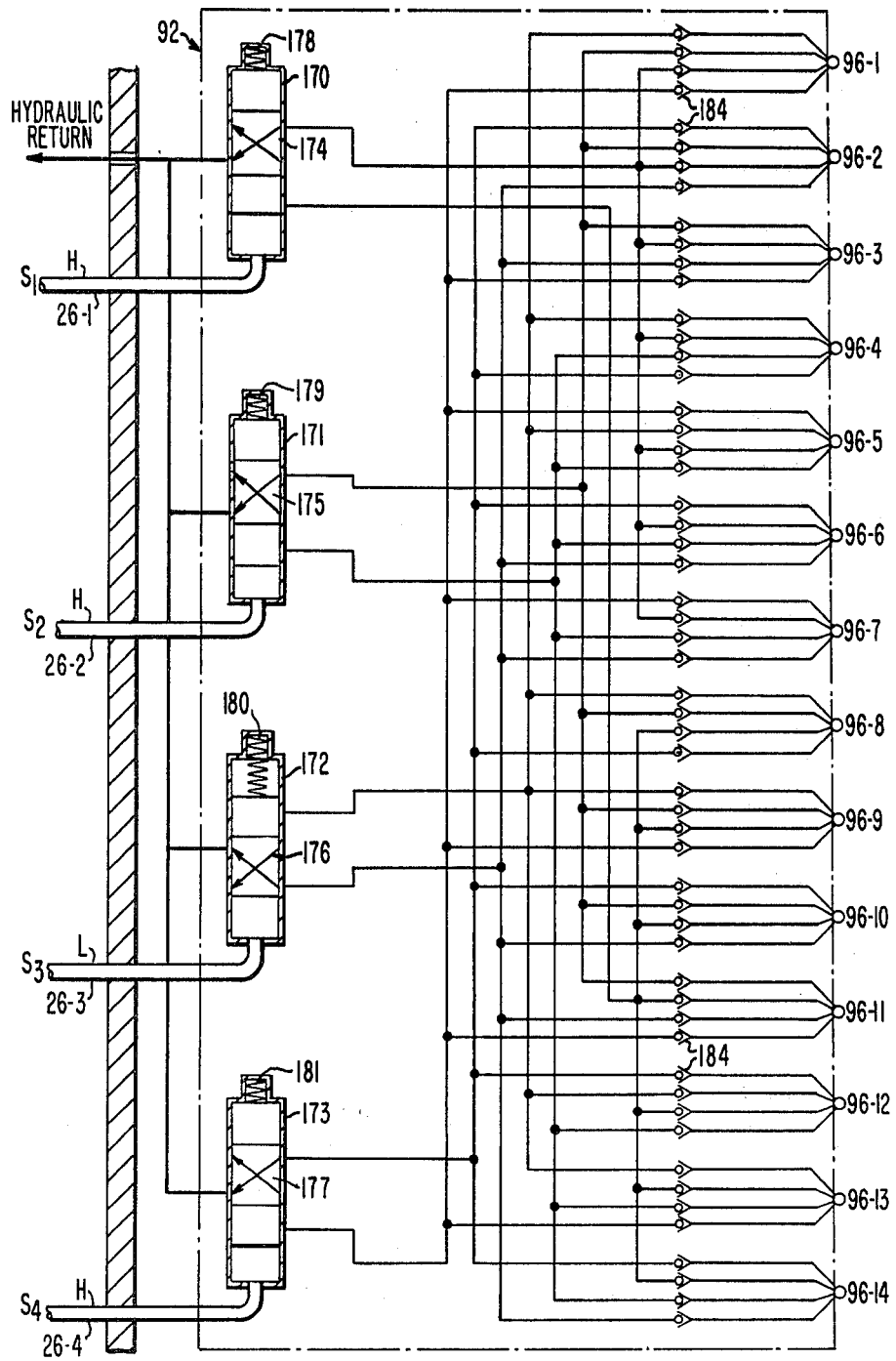

FIG. 14 illustrates the return line decoder configuration in response to the HHLH signal pattern. It is seen that the four lines branching from port 96-13 are not afforded a return path through any of the valves whereas the first and last lines branching from port 96-14 do find such return path through respective valves 173 and 172. Movement of the spool of valve 70-7 downward (FIG. 5) then brings spool sections 72-7 into the flow path to thereby connect high pressure line 18 to line 62-7 via line 196 and to connect line 64-7 to the low pressure line 19 by way of line 198.

The embodiment described herein has been given merely by way of example and is evident that numerous modifications are possible. For example, although the control valves 12-1 to 12-N are shown on a one-to-one basis with the control devices 10-1 to 10-N, an arrangement may be provided where one control valve controls the activation of multiple devices.

Further, the example illustrated shows both hydraulic supply and return lines. Certain systems may allow the use of water or air as the activating fluid and in such instance, the return may be dumped to the ambient medium, with movement of the device to a first position being accomplished by means of the activating fluid and a return to a second position being accomplished by other means, such as spring means or gravity, by way of example.

If an arrangement can be tolerated where only one device at a time is to be active (that is, it must be extended and thereafter retracted before a next device is extended) then the output valves illustrated in FIG. 5 may be eliminated and the device supplied directly from the supply decoder 90 and vented directly via return decoder 92. Additionally, the coding sequence given for effecting mast and fairing activation is shown by way of example and that other binary sequences may be utilized.

The valves illustrated herein are commercially available items and are extremely fast acting, with movement time of the spools from one position to another being a small fraction of a second. If desired, binary fluidic valves may be utilized for achieving the same operation without moving parts.

I claim:

1. A fluid control system for controlling the operation of a plurality of fluid activated devices, comprising:
   (A) a source of activating fluid including a relatively high pressure supply portion and a relatively low pressure return portion;
   (B) a plurality of fluid control lines;
   (C) means including control valve means for impressing predetermined signal pressure patterns of relatively high and low pressures in said control lines in accordance with the selective activation of said control valve means;
   (D) means including a supply decoding section responsive to said signal pressure patterns for connecting said high pressure supply section of said source of activating fluid to selected ones of said fluid activated devices; and
   (E) means including a return decoder section responsive to said signal pressure patterns for connecting said selected ones of said fluid activated devices to said low pressure return section of said source of activating fluid.
2. Apparatus according to claim 1 wherein:
   (A) the number of said control valve means is N; and
   (B) the number of said fluid control lines is n, where $2^2 \geq 2N$.
3. Apparatus according to claim 1 wherein:
   (A) said source of activating fluid is additionally connected to said control valve means.
4. Apparatus according to claim 1 wherein:
   (A) said activating fluid is a hydraulic fluid.
5. Apparatus according to claim 1 wherein:
   (A) said control valve means is positioned at one location having an ambient pressure $P_1$;
   (B) said plurality of fluid activated devices are at a second location having an ambient pressure $P_2$.
6. Apparatus according to claim 5 wherein:
   (A) said ambient pressure $P_2$ is greater than said ambient pressure $P_1$.
7. Apparatus according to claim 6 wherein:
   (A) said one location is within an enclosure; and wherein
   (B) said fluid control lines pass through a wall of said enclosure.
8. Apparatus according to claim 7 wherein:
   (A) said source of activating fluid is also within said enclosure; and wherein
   (B) said connection from said source of activating fluid to said selected ones of said fluid activated devices also passes through a wall of said enclosure.
9. Apparatus according to claim 1 which includes:
   (A) interlock means for preventing activation of a control valve means when another control valve means is being activated.
10. Apparatus according to claim 9 wherein:
    (A) each said control valve means includes a movable portion, movable when said control valve means is activated;
    (B) solenoid driven locking means for each said control valve means operable when activated to prevent movement of said movable portion;
    (C) a source of electrical energization;
    (D) switch means associated with each said movable portion and being responsive to any movement thereof due to activation of a particular control valve means to couple said source of electrical energization to all of said solenoid driven locking means of the remaining ones of said control valve means to prevent their activation.

11. Apparatus according to claim 1 which includes:
(A) a plurality of output valves each for connecting said source of activating fluid to a respective one of said fluid activated devices;
(B) said supply and return decoder sections being responsive to said signal pressure patterns for permitting a predetermined flow of said activating fluid to and from a selected one of said output valves.

12. Apparatus according to claim 11 wherein:
(A) each said output valve includes a member movable between first and second positions as governed by said supply and return decoding sections;
(B) means for retaining said member in said first position until actively moved to said second position by activation of said supply and return decoding sections and for retaining said member in said second position until actively moved to said first position by activation of said supply and return decoding sections.

13. Apparatus according to claim 12 wherein:
(A) said movable member is a spool member having first and second spool sections for establishing two different fluid flow patterns through said output valve.

* * * * *